United States Patent [19]

Maxcy

[11] Patent Number: 4,917,361
[45] Date of Patent: Apr. 17, 1990

[54] SNATCH BLOCKS

[76] Inventor: Richard B. Maxcy, Rte. 131, Warren, Me. 04864

[21] Appl. No.: 317,570

[22] Filed: Mar. 1, 1989

[51] Int. Cl.[4] ............................................. B66D 3/04
[52] U.S. Cl. .................................. 254/411; 254/390; 254/415
[58] Field of Search ............... 254/390, 407, 409, 411, 254/415, 416, 412

[56] References Cited

U.S. PATENT DOCUMENTS

| | | | |
|---|---|---|---|
| 1,061,895 | 5/1913 | Bierce | 254/405 |
| 1,085,017 | 1/1914 | Card | 254/407 |
| 1,145,110 | 7/1915 | Ball | 254/405 |
| 1,164,919 | 12/1915 | Carlson | 254/405 |
| 1,462,631 | 7/1923 | Barnes | 254/409 |
| 1,736,193 | 11/1929 | Erdahl | |
| 2,197,698 | 4/1940 | Lambreth | 254/412 X |
| 3,109,627 | 11/1963 | Stanulis | 254/409 X |
| 4,549,723 | 10/1985 | Castilano | 254/411 X |

OTHER PUBLICATIONS

"Quality Lobster Blocks Build to Last", Superior Marine Products Inc., Westbrook, Me., Brochure, no date available.
*Lobster Blocks,* Superior Marine Products, Inc. Westbrook, Me., 04092 (no date available).
*Hydro—Slave,* Marine Hydraulic Engineering Co., Inc., (no date available).

*Primary Examiner*—Katherine A. Matecki

[57] ABSTRACT

A snatch block has its sheave established by connecting the smaller ends of a pair of frusto-conical shell portions to a central member rotatably mounted on an axle protruding from one side of the hanger. The larger ends of the portions merge with end walls which are normal to the axis of the sheave and extend outwardly a distance greater than line diameters. The end walls have lips which are disposed relative to fixed water shields in a manner preventing a line, running against an end wall, from contacting the proximate water shield.

5 Claims, 2 Drawing Sheets

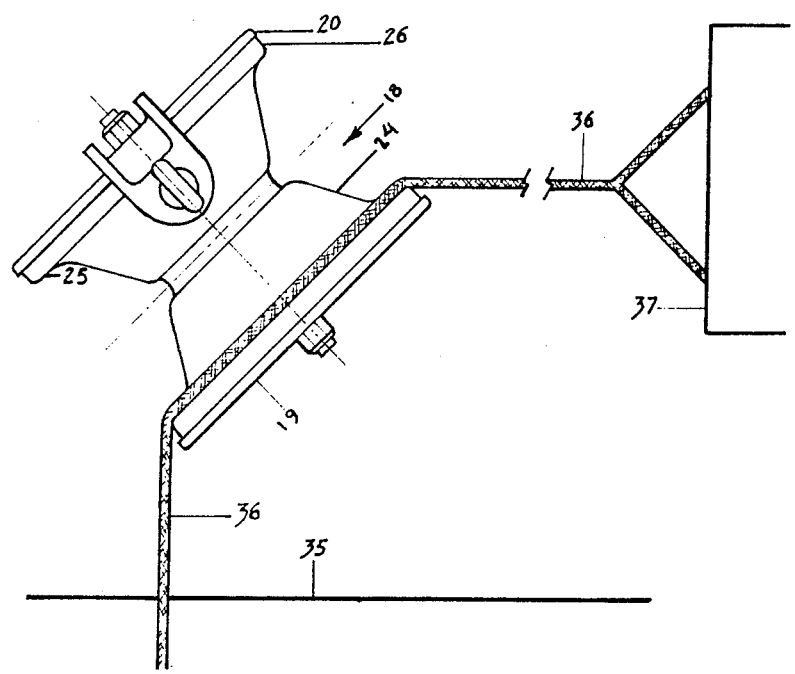

SNATCH BLOCKS

BACKGROUND OF THE INVENTION

A snatch block consists of a hanger attachable to a davit by a swivel and provided with a sheave exposed to enable a line to be brought into engagement with the sheave from one side thereof.

Snatch blocks are widely used by lobster fishermen to enable traps to be hauled by a trap hauler to the side of their boats, lifted from the water and then swung inboard. In practise, the line adjacent the pot is caught and manually pulled to provide enough line to enable it to be supported by the sheave and caught by the trap hauler. The sheaves of snatch blocks typically have a central portion of minimum diameter and frusto-conical side portions the larger, outer ends of which are free fits within fixed water shields. This design enables toggles, line splices, etc. to pass freely through the sheave.

A problem encountered in the use of snatch blocks arises from the fact that the position of a boat relative to the trap being hauled varies due to such factors as currents and the direction and strength of the wind. If the trap being hauled is directly abaft, the line runs substantially straight from the trap over the sheave to the trap hauler. If a trap is more or less ahead of the boat or more or less astern thereof, an angle exists in the line between that portion between the trap and the sheave and the portion extending from the sheave to the trap hauler.

Any such angle tends to cause the hanger to swing and the line to move from the central portion of the sheave onto one of the frusto-conical portions thereof and also to cause the swivelling of the hanger. If the angle between such line portions decreases to an extent such that the line is pulled against the adjacent fixed water shield not only is the line chafed but also, if the water shield is at the open side of the snatch block, the line may and not infrequently does escape from the sheave. When that happens, it is necessary to reposition the boat and again catch the line to enable the interrupted hauling to be continued.

THE PRESENT INVENTION

The general objective of the present invention is to provide a snatch block which makes the escape of lines from its sheaves unlikely regardless of the angular relationship between the portion of the line extending from the trap to the sheave and the line portion running from the sheave to the trap hauler and also to prevent the line from being chafed by contact with any fixed portion of the snatch block.

In accordance with the invention, this objective is attained with a sheave having the outer larger ends of the frusto-conical portions merge with end walls disposed normal to the sheave axis and of a radial extent greater than the maximum diameter of the lines to be pulled. The end walls terminate in peripheral outwardly disposed lips exposed for engagement by the line, one of which is engaged when the trap is well ahead of the boat and the other when the trap is sufficiently astern thereof.

It has been found that if the line slips along a frusto-conical sheave portion and against the proximate end wall not only does its engagement with the rotating end wall minimize the possibility of its escaping from the sheave but also its engagement with the flat surface of the end wall causes the sheave and the hanger to swivel more readily in response either to a pull on the line or to the drag due to the trap, which ever is dominant.

Another objective of the invention is that of decreasing the weight and increasing the quality of the sheave, an objective attained by forming the sheave from two identical stainless steel sections and an intermediate spacer. The two sections have end flanges disposed towards the axis of the sheave and these are secured to the sides of the spacer to complete the sheave.

Yet another objective of the invention is that of providing the snatch block with water shields which are fixed and have inturned rims within which the margins of the lips of the end walls of the sheave are a close, free fit leaving the major annular portions of the lips of the end walls so exposed as to ensure that the line when pulled against either of the lips of the sheave cannot engage the corresponding one of the water shield rims.

Other objectives, novel features and advantages of snatch blocks in accordance with the invention will be apparent from the accompanying drawings, the specification and the appended claims.

BRIEF DESCRIPTION OF THE DRAWINGS

The accompanying drawings illustrate a preferred embodiment of a snatch block in accordance with the invention of which

FIG. 3 is a schematic, bird's eye view of an installed snatch block with a trap being pulled towards a boat with the line on the snatch block sheave.

THE PREFERRED EMBODIMENT

Figure 1:
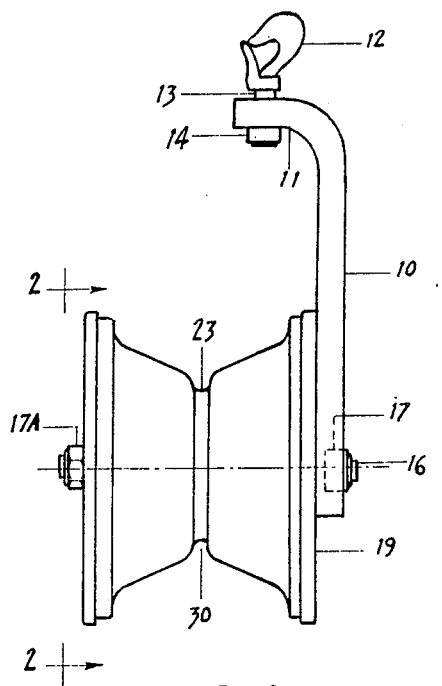
FIG. 1 is a side view of the snatch block.
Figure 2:
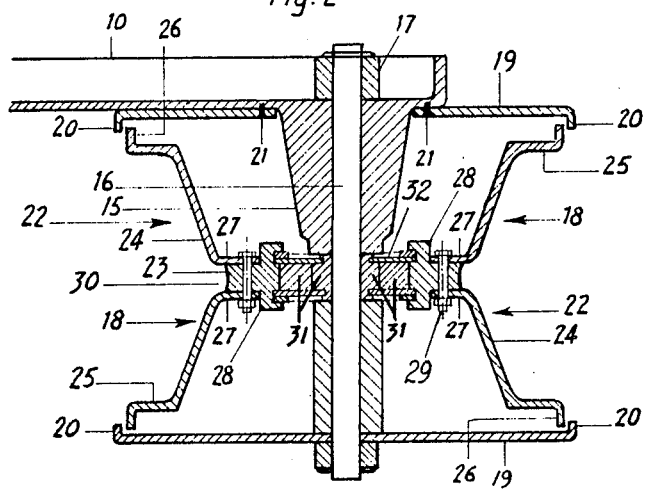
FIG. 2 is a section taken approximately along the indicated line 2—2 of FIG. 1.

The snatch block illustrated by the drawings has a hanger 10 the upper end of which extends laterally as a supporting arm 11. A hook 12 has its shank 13 extending through the arm 11 and is rotatably secured by a nut 14 threaded on the end of the shank exposed below the arm.

The lower end of the hanger 10 has a hub 15 through which one end of an axle 16 extends with a nut 17 threaded and locked thereon. Except for that portion of the arm 11 by which the hook 12 is rotatably supported, the hanger 10 is U-shaped in cross section. The nut 17 is, accordingly, exposed within the resulting channel.

A stainless steel sheave, generally indicated at 18, is rotatably mounted on the axle 16 between inner and outer water shields 19 having rims 20 disposed towards each other. The inner shield fits over the hub 15 and is secured against the hanger 10 by means of a screw 21.

The sheave 18 consists of identical inner and outer formed sections which are generally indicated at 22 and an intermediate, annular spacer 23 to which the proximate ends of the sections are connected. Each section 22 is formed by being spun, deep drawn or stamped to provide a relatively light weight, open ended frusto-conical portion or shell 24 of adequate strength. The inner end of each portion 24 is of minimum diameter. Each portion 24 has curved mergence with an end wall 25 which is normal with respect to the sheave axis and is of a radial extent greater than line diameters which are typically in the three eighths to five eighths inch range. The end walls 25 terminate in lips 26 which are shaped and disposed to curve away from each other. The inner end of each of the sheave portions 24 has curved mergence with an end flange 27 shaped and dimensioned to fit over the appropriate one of the shoulders 28 with which the spacer 23 is preferably provided with the flanges 27 connected to opposite side of the spacer 23 by welds or as shown, by a series of bolts 29. The exposed surface of the spacer 23 is slightly concave and the end flanges 27 are so dimensioned and disposed that they extend radially to define with that surface a channel 30 for the line.

A pair of bearing units 31 have their inner races fitted on the axle 16 and seated against the end of the hub 15. The spacer 23 fits on the outer races of the bearings units 31 and is held thereon by retaining rings 32. A sleeve 33 on the outer end of the axle 16 is seated against the inner race of the outer bearing unit 31 and the sleeve and the outer water shield 19 are locked in place by a nut 17A threaded on and locked to the free end of the axle 16.

The functions of the just detailed snatch block will be apparent from FIG. 3 in which the snatch block, generally indicated at 34 is suspended by a davit (not shown) alongside the generally indicated boat 35. The line 36, connected to a trap 37, is held by the sheave 18 and is being pulled inboard by a conventional trap hauler, not shown.

If the trap 37 was originally abaft the boat 35, the line 36 running on the sheave would be approximately straight from the trap to the trap hauler. Wind and water currents more often result in relative positions of the boat and trap such that an angle is formed between the line portion extending from the trap to the sheave and the line portion between the trap hauler and the sheave. Such angularities cause the hanger to swing with the axis of the sheave inclining in the general direction of the pull on the line. This results in the line 36 escaping from the channel 30 onto the lowered sheave section 22 and often against the end wall 25 of that section and in running contact with its lip 26. The combined effects of the rotating lip and the flat end wall effectively prevents the escape of the line from the sheave 18 and the chafing of the line. As the trap is lifted from the water, the snatch block swivels with the line returning to the channel 30.

I claim:

1. A snatch block for use when a line of a selected diameter, such as a line to which a lobster trap is attached, is to be pulled, said snatch block including a hanger having an arm extending laterally of one end, a supporting hook having a shank rotatably connected to the arm, a sheave, and means rotatably supporting the sheave and connecting the sheave to the hanger in a position underlying but spaced a substantial distance below the arm to enable the line to be passed laterally onto the sheave, said sheave including a central portion establishing a minimum sheave diameter and end portions increasing in diameter towards the respective ends of the sheave, each end portion including an end wall normal to the sheave axis and extending outwardly a distance greater than the line diameter to provide a line stop, each end wall including an annular lip extending substantially parallel with the sheave axis away from the sheave with the junction between each lip and wall so curved as to ensure that the line, when running across and against it, will not become chafed, and water shields, one for each end of the sheave and connected to and held by the hanger, each shield including a rim in the form of an annular flange within which the edge of the appropriate one of the lips is a close but free fit, the axial extent of the lips and the outside diameter of the rim flanges such that the line running across either lip does not engage the free edge of the associated flange.

2. A snatch block for use when a line of a selected diameter, such as a line to which a lobster trap is attached, is to be pulled, said snatch block including a hanger having an arm extending laterally of one end, a supporting hook having a shank rotatably connected to the arm, a sheave, and means rotatably supporting the sheave and connecting the sheave to the hanger in a position underlying but spaced a substantial distance below the arm to enable the line to be passed laterally onto the sheave, said sheave including open ended, formed, stainless steel shells, each shell having first and second ends and increasing in diameter from the first end towards the second end, each first end having an inwardly disposed flange and each second end including an outwardly disposed flange normal to the sheave and constituting a line stop and terminating in an annular lip so curved away from the sheave as to ensure that the line running across and against it will not become chafed, and said means rotatably supporting and connecting the sheave to the hanger includes a spacer to which the inturned ends of the shells are connected.

3. The snatch block of claim 2 in which the inwardly disposed end flanges of the formed shells are connected to the sides of the spacer and the spacer is the central portion of the sheave.

4. The snatch block of claim 3 in which the inwardly disposed end flanges are of a radial extent such that an annular channel is formed thereby with the spacer constituting the bottom thereof.

5. The snatch block of claim 2 which further comprises water shields, one for each outwardly disposed end flange and provided with a rim in the form of an annular flange and each of said end walls includes an annular lip extending parallel to the sheave axis and away from the sheave, each lip is a close but free fit within the appropriate one of the annular water shield flanges and the axial extent of the lips and the outside diameter of the water shield flange such that the line running across either lip does not engage the free edge of the associated water shield flange.

* * * * *